(12) United States Patent
Bachleda et al.

(10) Patent No.: US 9,065,911 B2
(45) Date of Patent: Jun. 23, 2015

(54) SYSTEM, METHOD AND ARCHITECTURE FOR CONTROL AND MULTI-MODAL SYNCHRONIZATION OF SPEECH BROWSERS

(75) Inventors: Frantisek Bachleda, Kosice (SK); Jan Kleindienst, Nove Straseci (CZ); Martin Labsky, Prague (CZ); Jan Sedivy, Modrany (CZ); Ladislav Seredi, Nove Mesto (CZ); Lubos Ures, Kladno (CZ); Keith Grueneberg, Stewart Manor, NY (US)

(73) Assignee: Nuance Communications, Inc., Burlington, MA (US)

( * ) Notice: Subject to any disclaimer, the term of this patent is extended or adjusted under 35 U.S.C. 154(b) by 1675 days.

(21) Appl. No.: 11/864,229

(22) Filed: Sep. 28, 2007

(65) Prior Publication Data

US 2009/0089064 A1    Apr. 2, 2009

(51) Int. Cl.
*G10L 15/30*    (2013.01)
*H04M 3/493*    (2006.01)

(52) U.S. Cl.
CPC ............... *H04M 3/493* (2013.01); *G10L 15/30* (2013.01); *H04M 2207/40* (2013.01)

(58) Field of Classification Search
CPC ......... G10L 21/00; G10L 21/06; G10L 15/00; G10L 2015/00; G10L 2015/226; G10L 2015/227; G10L 2015/228
USPC ............... 704/271, 270, 235, 231, 275, 270.1
See application file for complete search history.

(56) References Cited

U.S. PATENT DOCUMENTS

| | | | |
|---|---|---|---|
| 6,012,030 A * | 1/2000 | French-St. George et al. | 704/275 |
| 6,725,155 B1 * | 4/2004 | Takahashi et al. | 701/209 |
| 6,839,896 B2 | 1/2005 | Coffman et al. | |
| 6,983,307 B2 | 1/2006 | Mumick et al. | |
| 7,020,841 B2 | 3/2006 | Dantzig et al. | |
| 7,028,306 B2 | 4/2006 | Boloker et al. | |
| 7,032,169 B2 | 4/2006 | Ativanichayaphong et al. | |
| 7,080,315 B1 | 7/2006 | Lucas et al. | |
| 2002/0198720 A1 * | 12/2002 | Takagi et al. | 704/270.1 |
| 2003/0088421 A1 * | 5/2003 | Maes et al. | 704/270.1 |
| 2007/0250841 A1 * | 10/2007 | Scahill et al. | 719/320 |

FOREIGN PATENT DOCUMENTS

CA    2 346 606    12/2001

* cited by examiner

*Primary Examiner* — Qi Han
(74) *Attorney, Agent, or Firm* — Wolf, Greenfield & Sacks, P.C.

(57) ABSTRACT

Clients connecting to a VoiceXML browser obtain a control channel. Using this channel, clients may initialize a new VoiceXML session or attach to an existing VoiceXML session. The client after obtaining a session may perform a range of actions including controlling and monitoring actions.

14 Claims, 3 Drawing Sheets

SYSTEM, METHOD AND ARCHITECTURE FOR CONTROL AND MULTI-MODAL SYNCHRONIZATION OF SPEECH BROWSERS

FIELD OF THE INVENTION

The present disclosure generally relates to computer applications, and particularly to an implementation of a control channel and protocol for VXML browser, for instance, to bind it with a rich graphical user interface (GUI) front-end and create and deliver monolithic or distributed multi-modal applications.

BACKGROUND OF THE INVENTION

VoiceXML (Voice eXtensible Markup Language) is an XML-based markup language for creating distributed voice applications, similar to an HTML (HyperText Markup Language) used for creating distributed visual applications. VoiceXML thus enables Internet content and information accessible via voice and telephone. VoiceXML browsers, according to the W3 consortium website, aim to bring the benefits of Web technology to the telephone, enabling developers to create interactive voice response (IVR) applications accessible by phone, and allowing people to interact with these applications via speech and telephone keypads. With a VoiceXML browser that interprets VoiceXML, a user may interact with a Web site over the telephone using speech, for instance, rather than a computer or keypad to access the Web information and services.

It would be desirable to have a system and method that integrates such capability with a GUI platform, to provide a multi-modal interface.

BRIEF SUMMARY OF THE INVENTION

System and method for control and multi-modal synchronization of speech browsers are provided. In one aspect, the method may comprise establishing a protocol to control and re-define one or more behaviors of built-in form interpretation algorithm of a VoiceXML form, to control one or more parameters and one or more behaviors of audio subsystem and to set one or more parameters of voice recognition module, the protocol further to monitor one or more events associated with processing VoiceXML markup, to monitor one or more events associated with processing an audio stream, and one or more events associated with recognition results.

In another aspect, the method may comprise obtaining a control channel for communicating between a VoiceXML browser and a server application via a front-end application of the server application, establishing a VoiceXML session via a front-end application, and allowing a user to perform a plurality of actions via the VoiceXML session.

A system for control and multi-modal synchronization of speech browsers, in one aspect, may include a VoiceXML browser operable to connect to a front-end application, a server module operable to provide one or more VoiceXML sessions, and a control channel established between the VoiceXML browser and the one or more VoiceXML sessions via the front-end application. The VoiceXML browser and the front-end application provide speech-enabled browser capability to a client device.

Further features as well as the structure and operation of various embodiments are described in detail below with reference to the accompanying drawings. In the drawings, like reference numbers indicate identical or functionally similar elements.

DETAILED DESCRIPTION

System, architecture, and methodologies that allow a web application with a rich GUI to use speech recognition are provided. A method and system of the present disclosure in one embodiment implements a control channel into a VXML (Voice eXtensible Markup Language) browser and integrates it with a diverse set of GUI platforms to create multi-modal, for example, combining speech interface with GUI. The method and system described in this disclosure may be used further, inter alia, as architecture and programming model for multi-modal Web applications that combine several technologies including a VoiceXML browser.

In one embodiment, a remote channel is provided that allows for controlling and monitoring the behavior of a VoiceXML browser, enabling the integration with voice and multi-modal applications, traffic monitors, debuggers and other clients. In another embodiment, a lightweight VoiceXML browser is provided that can be embedded within applications. Yet in another embodiment, a novel architecture and design is provided that delivers multi-modal user interface for media-rich web content, for example, for Adobe® Flash® applications by adding automated speech recognition (ASR) by means of a lightweight VoiceXML (VXML) browser. Still yet in another embodiment, Extensive Markup Language (XML) protocol is provided that enables the control of the browser by the external application usually providing the GUI. This application may contain the application logic (AL) as well, or the AL can be shared between the VXML browser, which may be governed by the form interpretation algorithm (FIA), and the external application. The VXML browser is effectively converted from a client to a server.

In a further embodiment, a system is presented for managing the life-cycle of the lightweight VXML browser on the user's machine, i.e. running and shutting down the browser depending on the world wide web pages visited. One aspect of this embodiment creates plug-in mechanism into a browser with implemented correct logic for running and shutting down of VoiceXML browser to provide multi-modal functionality for Adobe® Flash® applications. The plug-in mechanism, in one aspect, guarantees that the VXML browser starts at right time, insures the full VXML browser functionality when a superior application requests VXML services, shuts down the VXML browser and prevents multiple VXML browsers from running at the same time. The architecture, in one aspect, provides version policy mechanism that is responsible to notify a superior application (e.g., Adobe® Flash® application), that updating of VXML browser is needed.

Yet further in another embodiment, a security server is provided which gives permission for the Flash® GUI front end to open a socket in a different domain. The socket is opened, for example, in order to communicate with the lightweight VoiceXML browser.

Figure 1:
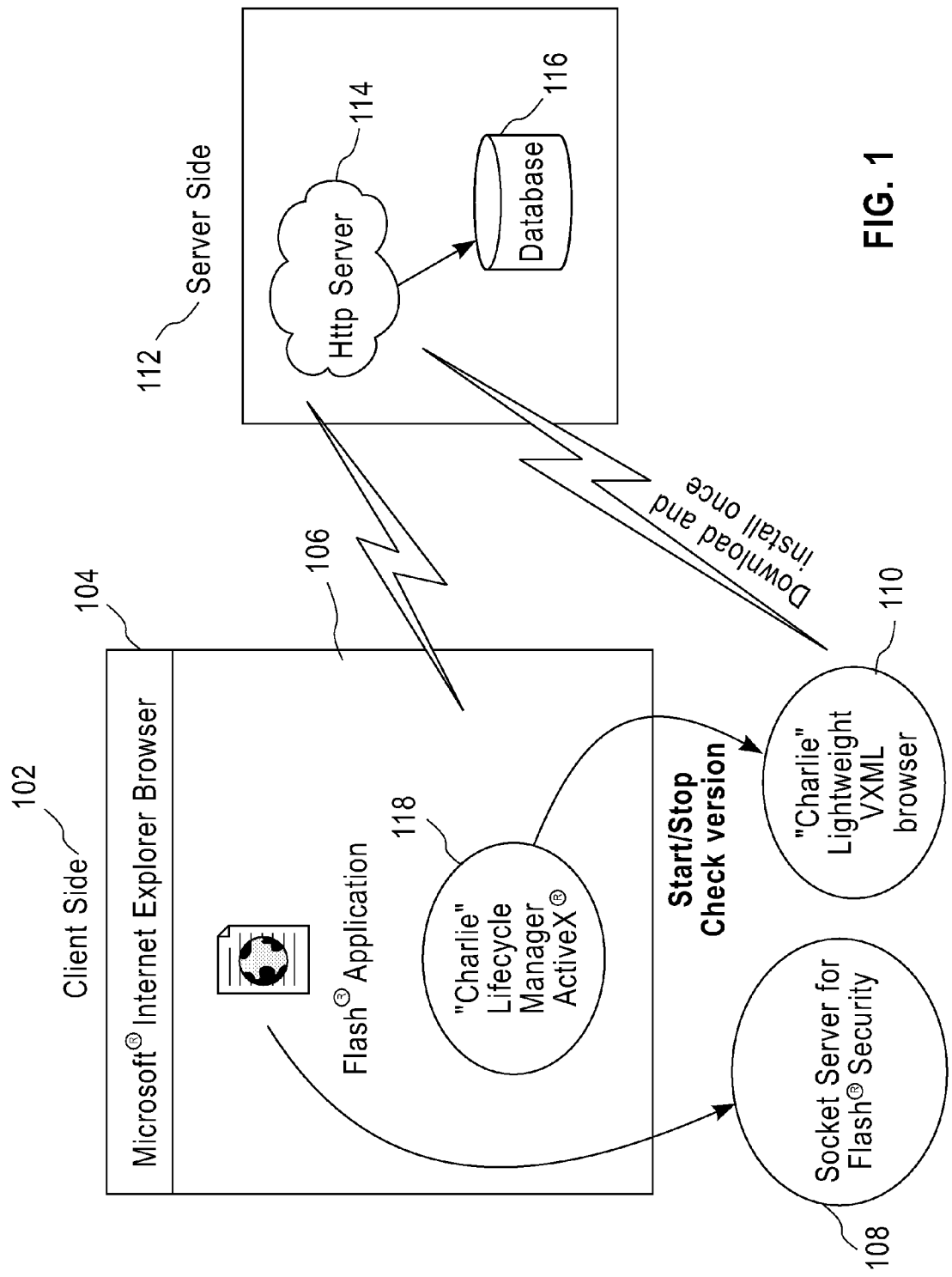
FIG. 1 is a high level diagram illustrating a web application.

FIG. 1 is a high level diagram in one embodiment of the present disclosure illustrating a web application. The client side 102 includes the web browser 104 (e.g., Microsoft® Internet Explorer, Netscape® Communicator, etc.), which can interpret and render a web page 106 retrieved, for example, from an HTTP server 114 and database 116 at a server side 112. A web page 106 may integrate Flash® player and movie (or other rich-media interface), and the ActiveX® Lifecycle Manager 118. A socket server for Flash® Security 108 in one embodiment is responsible to enable the flash movie downloaded from the Web to interact with the local VoiceXML browser, which handles speech recognition. Since for security reasons, Flash player content, by default, cannot access resources (including socket servers) outside its "home" URL, a socket server 108 is utilized.

The VoiceXML browser 110 is a lightweight implementation in one embodiment. Unlike Flash GUI, it runs locally and handles the speech recognition part of the user interface. In one embodiment, it is connected to the Flash GUI socket client by a persistent socket connection as a server. A system and method in one embodiment provides this bi-directional socket channel and the protocol it uses. A unique implementation of the VXML browser of the present disclosure also allows the client to send the browser VoiceXML markup snippets, to execute them and to receive various notifications about VXML events, including recognition results.

Figure 2:
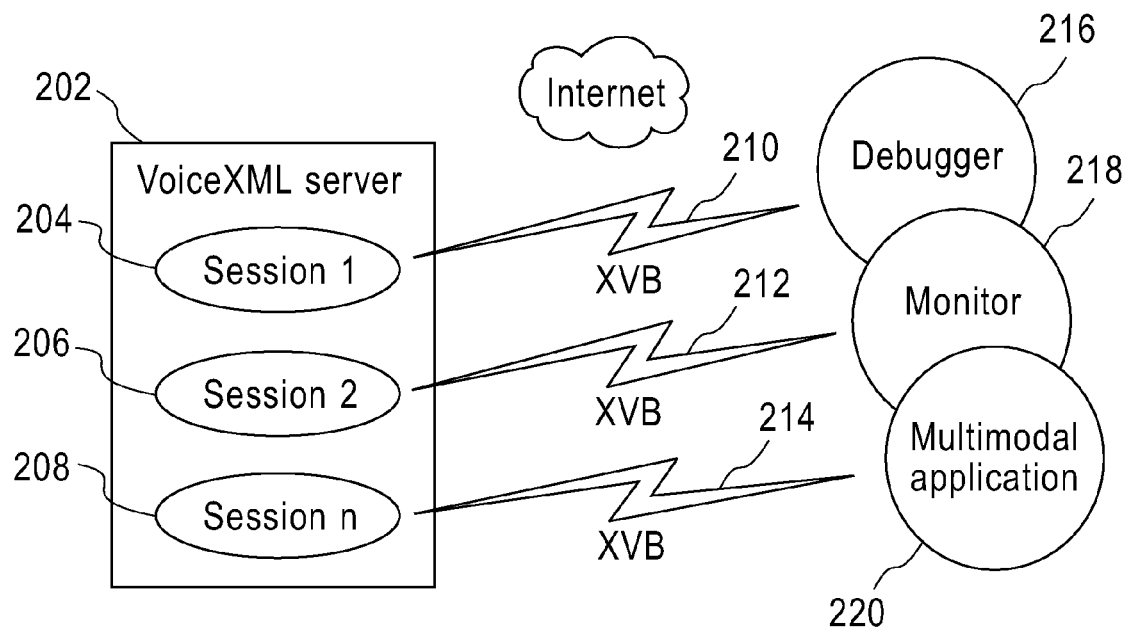
FIG. 2 shows one or more remote channels of the present disclosure in one embodiment for controlling and monitoring a VoiceXML browser.

FIG. 2 shows one or more remote channels of the present disclosure in one embodiment for controlling and monitoring a VoiceXML browser. A client device may connect to a VoiceXML server 202 via communication network such as the PSTN (public switched telephone network), Internet, Intranet, and/or WAN, but not limited to those communications networks. The VoiceXML server 202 may include a VoiceXML browser that the client device can access and establish a session (e.g., 204, 206, 208).

A client device, for example, running applications 216, 218, 220 connects to the VoiceXML browser and obtains a control channel 210, 212, 214, for example, via standard socket connection, the VXML browser acting as a server and Flash acting as client. Using this channel, e.g., shown at 210, 212 214, a client device may initialize a new VoiceXML session or attach to an existing VoiceXML session, for instance, by employing specific commands of the protocol provided in the system and method of the present disclosure. A typical startup sequence for a multi-modal application usually starts with an "init" request from Flash, followed by a "load" request attempting to load and parse a VoiceXML document to the browser. The subsequent "exec" request executes one of the forms contained in the loaded VoiceXML document. In one embodiment, the described communication takes place through the aforementioned socket channel directly between the Flash content and VoiceXML browser (FIG. 1, 110).

The implementation of protocol allows many other commands, like setting or getting properties (including standard VoiceXML ones) and others specifying, what information and how often should be reported by the VoiceXML browser back to the client set or get VoiceXML variables, step, pause or resume an executing document; change focus of the executing document; open and close audio input from the user while executing a document; simulate user input while executing a document; cancel the execution of document; terminate the VoiceXML session; detach from the VoiceXML session, leaving it in its current state.

Figure 3:
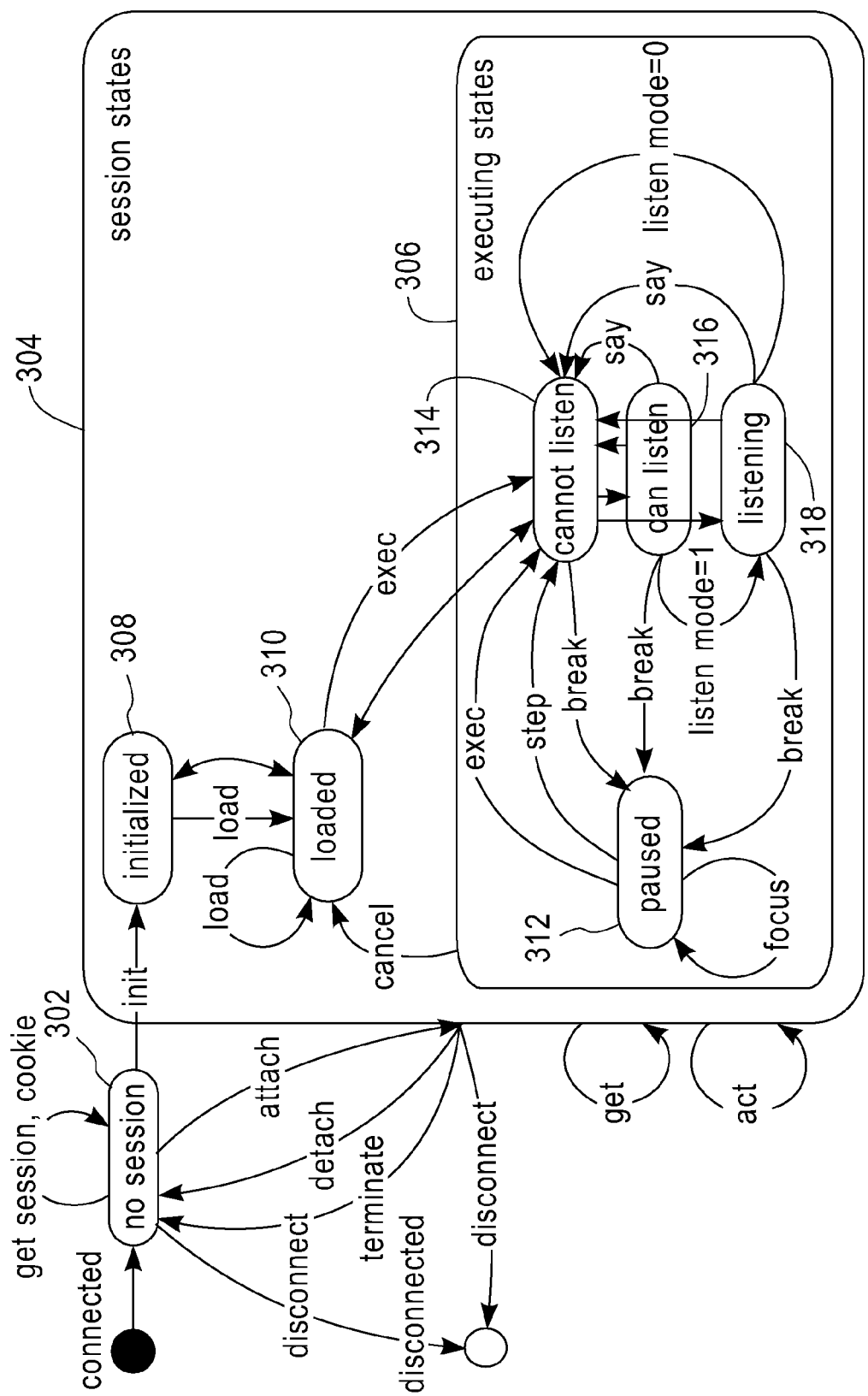
FIG. 3 shows VoiceXML control channel states and corresponding available actions in one embodiment of the present disclosure.

A state diagram in FIG. 3 summarizes different states of a VoiceXML control and monitoring channel described above and shows which actions are available to a client represented by a Flash application in which state. Ovals correspond to states, transition labels correspond to actions which may result in changing the state. Outer ovals represent generalizations over detailed types of states. Unlabeled transitions represent possible state changes caused by VoiceXML application logic, which is governed by the VXML standard, not by explicit actions. In one embodiment of the state diagram, there are three kinds of states of a control channel: sessionless states 302, session states 304, and executing states 306. A VoiceXML control channel is in session-less states 302 before a session is established. Once a session is established, a control channel transitions to session states 304. Within the session states 304, a control channel may transition to executing states for performing one or more requested actions.

Session states 304 may include but are not limited to initialized state 308, loaded state 310, and executing states 306. Executing states 306 may include but are not limited to paused state 312, cannot listen state 314, can listen state 316 and listening state 318. At 302, a client application requests connection to a VoiceXML and a control channel is established, for instance, using HTTP socket connections. The control channel at this point is in a no session state 302. The control channel, a bidirectional communication channel, is established by the VXML browser (FIG. 1, 110) and a client (e.g., Flash or other GUI front-end). The control channel gets a session, including a session cookie in this state. The VXML browser and a client initializes a VoiceXML session. When a VoiceXML session is initialized, the control channel state transitions to the initialized state 308. When a VoiceXML session is loaded, that is, a VXML document is loaded into the VXML browser (FIG. 1, 110), the control channel state transitions to the loaded state 310. After loading, the control channel state transitions to executing states 306 in which actions are performed. These states allow control of the VoiceXML browser from an external source and to use it as a flexible and easy to use high-level speech recognition engine, while retaining its full functionality as a browser.

The following describes an example scenario of implementing and using the system and method of the present disclosure in one embodiment. A web browser application is created using a front-end application such as an Adobe® Flash® front-end. In this example, the web browser application uses speech recognition to help students practice reading. A student interacts with the Flash front-end and gets feedback on their reading progress. When a student logs in to the Web site, the application uses JavaScript to communicate with the ActiveX® Lifecycle Manager (FIG. 1, 118). The Lifecycle Manager checks if the correct version of the VXML Browser (FIG. 1, 110) is available. If the correct version of the VXML browser is installed and available, then a command is sent from the Lifecycle Manager to start the VXML Browser. As a student begins a reading session, the Flash application opens a socket and sends a series of commands to the VXML browser. For example, "Can listen" (FIG. 3, 316) and "Listening" (FIG. 3, 318) states turn on the computer's microphone. So, when a student reads a word, the VXML browser listens to what is spoken through the microphone, the microphone is turned off when the student indicates that he or she is finished, for instance, by a mouse click. The recognized words from the VoiceXML server (e.g., FIG. 2, 202) are returned to the Flash application. When the student logs off of the Web site, the ActiveX® Lifecycle Manager shuts down the VoiceXML browser.

Figure 4:
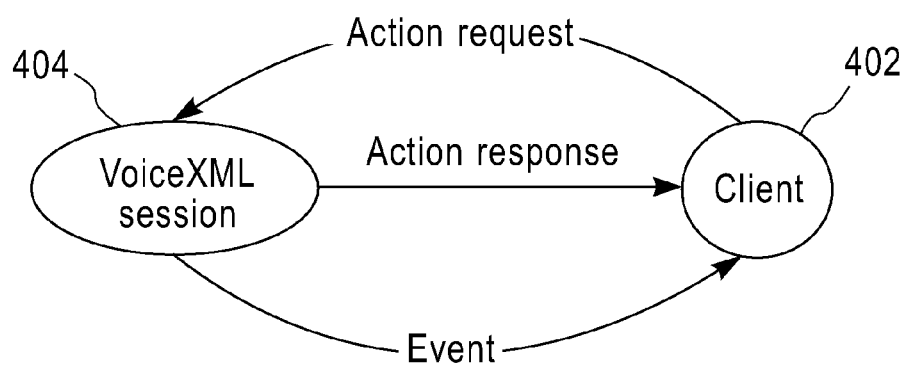
FIG. 4 shows the actions requests, action responses and events in one embodiment of the present disclosure.

In addition to initiating actions, the client application connected to the VXML browser gets notified about the behavior of the controlled VoiceXML session by the browser. FIG. 4 illustrates requests and responses between a VoiceXML session and a client. A client 402 requests an action and a VoiceXML session 404 performs the requested action or attempts to perform the action. The VoiceXML session 404 then responds with one or more notifications from performing the action. Types of notification may include but are not limited to responses to actions and asynchronous or unsolicited events. Thus, notifications may include action responses, for example, data requested by the client 402, error codes or reasons if the requested action could not be performed or completed. In one embodiment, a single response is issued for each action when it completes.

By setting relevant properties, clients may subscribe for selected event types. Event types may include, but are not limited to: VoiceXML event notifications; focus notifications; VoiceXML variable change notifications; control channel state change notifications; recognition/recording volume-in level notifications; audio/TTS volume-out level notifications; audio/TTS playback notifications; timeout countdown notifications; VoiceXML line number notifications; breakpoint reached notifications; logging messages; information about currently used resources including VoiceXML documents; grammars, audio resources and scripts.

A VoiceXML browser of the present disclosure in one embodiment provides control and notification protocol. The control part may allow clients to control and re-define the behavior of build-in form interpretation algorithm (FIA). Briefly, a form interpretation algorithm determines the order of execution in a VoiceXML form or menu. The control part also allows for controlling the parameters and behavior of audio subsystem, for example, gain, etc.; setting parameters of voice recognition module, for example, language, etc. The notification part may allow clients to monitor events associated with processing the VoiceXML markup; monitor events associated with processing the audio stream such as audio level; monitor events associated with recognition results, for example, speech over beep, etc.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of operating a lightweight VoiceXML browser installed on a client computer, the method comprising:
   determining, by at least one processor on the client computer, whether a web page displayed by a web browser executing on the client computer includes a Flash application integrated with the web page; and
   establishing a communication channel between the Flash application and the lightweight VoiceXML browser, when it is determined that the web page includes the web a Flash application.

2. The method of claim 1, wherein determining whether a web page displayed by a web browser executing on the client computer includes a Flash application comprises determining, by a plug-in associated with the web browser, information about content of the web page.

3. The method of claim 1, wherein establishing a communication channel between the Flash application and the lightweight VoiceXML browser when it is determined that the web page includes the Flash application comprises:
   determining whether a user has logged into the Flash application on the web page; and
   establishing the communication channel in response to determining that the user has logged into the Flash application on the web page.

4. The method of claim 3, further comprising:
   determining whether the user has logged out of the Flash application on the web page; and
   disconnecting the communication channel between the Flash application and the lightweight VoiceXML browser, in response to determining that the user has logged out of the Flash application on the web page.

5. The method of claim 1, wherein the web application provides a rich-media interface.

6. The method of claim 1, wherein establishing a communication channel between the Flash application and the lightweight VoiceXML browser comprises establishing a socket connection between the Flash application and the lightweight VoiceXML browser.

7. The method of claim 6, wherein the socket connection is a persistent socket connection.

8. A client device comprising:
   a web browser executing on the client device and configured to interpret and render web pages retrieved from a web server;
   a lightweight VoiceXML browser; and
   at least one storage device in communication with at least one processor programmed to:
      determine whether a web page displayed by the web browser includes a Flash application integrated with the web page; and
      establish a communication channel between the Flash application and the lightweight VoiceXML browser, when it is determined that the web page includes a Flash application.

9. The client device of claim 8, further comprising a plug-in associated with the web browser, and wherein determining whether a web page displayed by the web browser includes a Flash application comprises determining, by the plug-in, information about content of the web page.

10. The client device of claim 8, wherein establishing a communication channel between the Flash application and the lightweight VoiceXML browser when it is determined that the web page includes the Flash application comprises:
    determining whether a user has logged into the Flash application on the web page; and establishing the communication channel in response to determining that the user has logged into the Flash application on the web page.

11. The client device of claim 10, wherein the at least one processor is further programmed to:
   determine whether the user has logged out of the Flash application on the web page; and
   disconnect the communication channel between the Flash application and the lightweight VoiceXML browser, in response to determining that the user has logged out of the Flash application on the web page.

12. The client device of claim 8, wherein the web application provides a rich-media interface.

13. The client device of claim 8, wherein establishing a communication channel between the Flash application and the lightweight VoiceXML browser comprises establishing a socket connection between the Flash application and the lightweight VoiceXML browser.

14. The client device of claim 13, wherein the socket connection is a persistent socket connection.

* * * * *